(12) United States Patent
MacKarvich

(10) Patent No.: US 7,234,783 B2
(45) Date of Patent: Jun. 26, 2007

(54) AXLE WITH REMOVABLE SPINDLE AND CAM KEY

(76) Inventor: Charles J. MacKarvich, 5901 Wheaton Dr., Atlanta, GA (US) 30336

( * ) Notice: Subject to any disclaimer, the term of this patent is extended or adjusted under 35 U.S.C. 154(b) by 61 days.

(21) Appl. No.: 10/883,949

(22) Filed: Jul. 2, 2004

(65) Prior Publication Data

US 2006/0001312 A1    Jan. 5, 2006

(51) Int. Cl.
*B60B 35/16* (2006.01)
(52) U.S. Cl. .................................... 301/132; 301/124.1
(58) Field of Classification Search ............. 301/124.1, 301/131–132; 403/335, 358, 378, 379.2, 403/379.4
See application file for complete search history.

(56) References Cited

U.S. PATENT DOCUMENTS

| | | | | |
|---|---|---|---|---|
| 214,449 A | * | 4/1879 | Reichelderfer et al. | 301/132 |
| 774,289 A | * | 11/1904 | Thomas | 301/132 |
| 894,131 A | * | 7/1908 | Frederick | 301/132 |
| 2,634,169 A | * | 4/1953 | Martin | 301/132 |
| 5,281,005 A | * | 1/1994 | Babcock et al. | 301/132 |
| 5,401,080 A | * | 3/1995 | Wenzel | 301/132 |
| 6,299,259 B1 | * | 10/2001 | MacKarvich | 301/127 |
| 6,926,371 B1 | * | 8/2005 | Gagnon | 301/132 |

* cited by examiner

*Primary Examiner*—Jason R. Bellinger
(74) *Attorney, Agent, or Firm*—Thomas, Kayden, Horstemeyer & Risley, LLP

(57) ABSTRACT

An axle assembly includes a spindle (12) that extends through a mounting collar (28) into the open end of the axle. A cam key (70) moves through a key hole (22) in the axle and registers with the cam slot (54) of the spindle. The cam surface (76) of the cam key (70) is reversible with the cam surface (76) engaging either the bearing surface (58) or the bearing surface (60) of the spindle, to urge the spindle into or out of the axle.

19 Claims, 5 Drawing Sheets

AXLE WITH REMOVABLE SPINDLE AND CAM KEY

FIELD OF THE INVENTION

This invention concerns an axle for a wheel of a vehicle. More particularly, the invention concerns an axle assembly whereby the spindle on which the wheel is mounted can be expediently and accurately mounted to the axle and expediently removed from the axle.

BACKGROUND OF THE INVENTION

The spindle that mounts a wheel to an axle assembly must be very accurately and rigidly connected to the axle assembly to assure proper operation and safety of the vehicle. For spring mounted axles the axle assembly will include an axle that extends transverse to the longitudinal center line of the vehicle and is supported by a spring system to the frame of the vehicle, and a mounting collar rigidly connected, as by welding, to the outwardly facing ends of the axle. One end of the spindle is inserted through the collar into the axle while the outer wheel support end of the spindle protrudes from the collar and is available for mounting the wheel. Various connector devices can be used to hold the mounting end of the spindle in the axle. For example, a pin or key can be inserted transversely through the axle and through the mounting end of the spindle for rigidly holding the spindle in place.

While the above described axle assemblies usually are structurally sound and safe, there are occasions when the spindle must be removed from the axle due to wear, change in size, or accident, etc. Removal and replacement of spindles is also desirable when the vehicle is used in corrosive environments, such as a boat trailer being occasionally moved into water where its wheels are submerged. The salt and dampness from the water tends to accelerate the deterioration of the spindle and its connection to the axle. Also, the owners of boats more frequently include people that are mechanically capable of maintaining, repairing, and caring for boats and trailers, and would be likely to undertake the change-out of axle spindles on a boat trailer.

Accordingly, this invention is directed to an axle assembly having a spindle that can be more easily installed in and removed from an axle.

SUMMARY OF THE INVENTION

Briefly described, the present invention concerns a wheel axle assembly, particularly for, but not limited to, boat trailers and other recreational vehicles, particularly to axles known as "spring axles" as opposed to "torsion axles."

The axle assembly includes a rectilinear, tubular axle having opposed hollow ends for the mounting of the wheels of a vehicle. In the embodiment disclosed herein, the axle is square in cross-section, but may be of other configurations as may be desired.

Each end of the axle may include a mounting collar rigidly connected thereto, for forming a receptacle for the spindle of the wheel and for forming a mounting plate for brakes to be mounted for engagement with the rotor of a disk brake, etc. The mounting collar also includes a spindle mounting sleeve that is sized and shaped to fit into the hollow end of the axle, thereby making a rigid connection between the collar and the axle.

The axle includes a keyhole extending transversely therethrough, and the spindle includes a cam slot that becomes aligned with the keyhole when the mounting end of the spindle is inserted through the collar and into the hollow end of the axle. A cam key is inserted through the keyhole and through the cam slot to hold the spindle in the axle. Complementary surfaces of the spindle and the axle engage each other for aligning the cam slot with the keyhole.

A feature of the invention is the cooperative relationship between the cam key, key hole and cam slot. The cam slot of the spindle is shaped with opposed, oppositely sloped bearing surfaces that receive the cam key. The cam key includes cam means for alternately engaging the bearing surfaces of the cam slot for urging the spindle in one direction along the axle when engaging one of the bearing surfaces and for urging the spindle in the opposed direction when engaging the other bearing surface. In the embodiment described herein, the cam means of the cam key is a sloped surface for wedge engagement with the bearing surfaces of the cam slot of the spindle. When the cam key is oriented in one position within the keyhole and in the cam slot of the spindle, the cam surface engages one of the bearing surfaces of the spindle. When the cam key is thrust into the keyhole the cam surface applies a force to the bearing surface of the spindle, and a component of the applied force urges the spindle axially along the axle. When the cam key is reversed or otherwise reoriented in the keyhole, its bearing surface engages the opposed bearing surface of the spindle and urges the spindle in the opposite direction along the axle. Thus, by orienting the cam key in one direction, the spindle is urged into a firm, static connection with respect to the axle, and by reorienting the cam key to engage the opposing bearing surface of the spindle, the cam key urges the spindle out of the axle. This provides the worker with the ability to expediently and securely mount the spindle in the end of the axle, not only locking the spindle to the axle but also using the cam means to wedge the spindle into its deepest seating within the axle. Further, when the spindle must be removed from the axle, the worker can extract the key from its keyhole in the axle, reorient the key, and then apply the key back through the key hole to the spindle, thus applying a wedging force against the bearing surface of the spindle that urges the spindle out of the axle.

Another feature of the invention is that the cam key includes a threaded shank that protrudes from the key hole that is exposed for mounting a threaded nut to the cam key, thereby assuring that the cam key is maintained in the key hole and continuously applies the desired wedge force against the spindle, for retaining the spindle in its desired position for wheel support.

Another feature of the invention is that when the cam key is positioned with its cam surface facing the bearing surface of the spindle that urges the spindle out of the axle, the worker can apply force to the cam key to drive the cam key into the key hole and drive its cam surface against the bearing surface to loosen the spindle from the axle. Once the spindle has become loosened with respect to the axle, the worker withdraws the cam key from the keyhole and withdraws the spindle from the axle.

Another feature of the invention is the use of complementary surfaces between the spindle and the axle to assure that the cam slot of the spindle is perfectly aligned with the keyhole of the axle.

Thus, it is an object of this invention to provide an improved axle assembly that includes a removable spindle and cam key for urging the spindle along the longitudinal axis of the axle, for mounting the spindle to the axle, and for demounting the spindle from the axle.

Another object of this invention is to provide an axle assembly for a wheeled vehicle that facilitates accurate and secure mounting of a spindle to an axle, and facilitates the removal of the spindle from the axle.

Another object of this invention is to provide an axle assembly for a wheeled vehicle that is of simple and economic construction and assembly.

Other objects, features and advantages of the present invention will become apparent upon reading the following specification, when taken in conjunction with the accompanying drawings.

DETAILED DESCRIPTION

Figure 1:
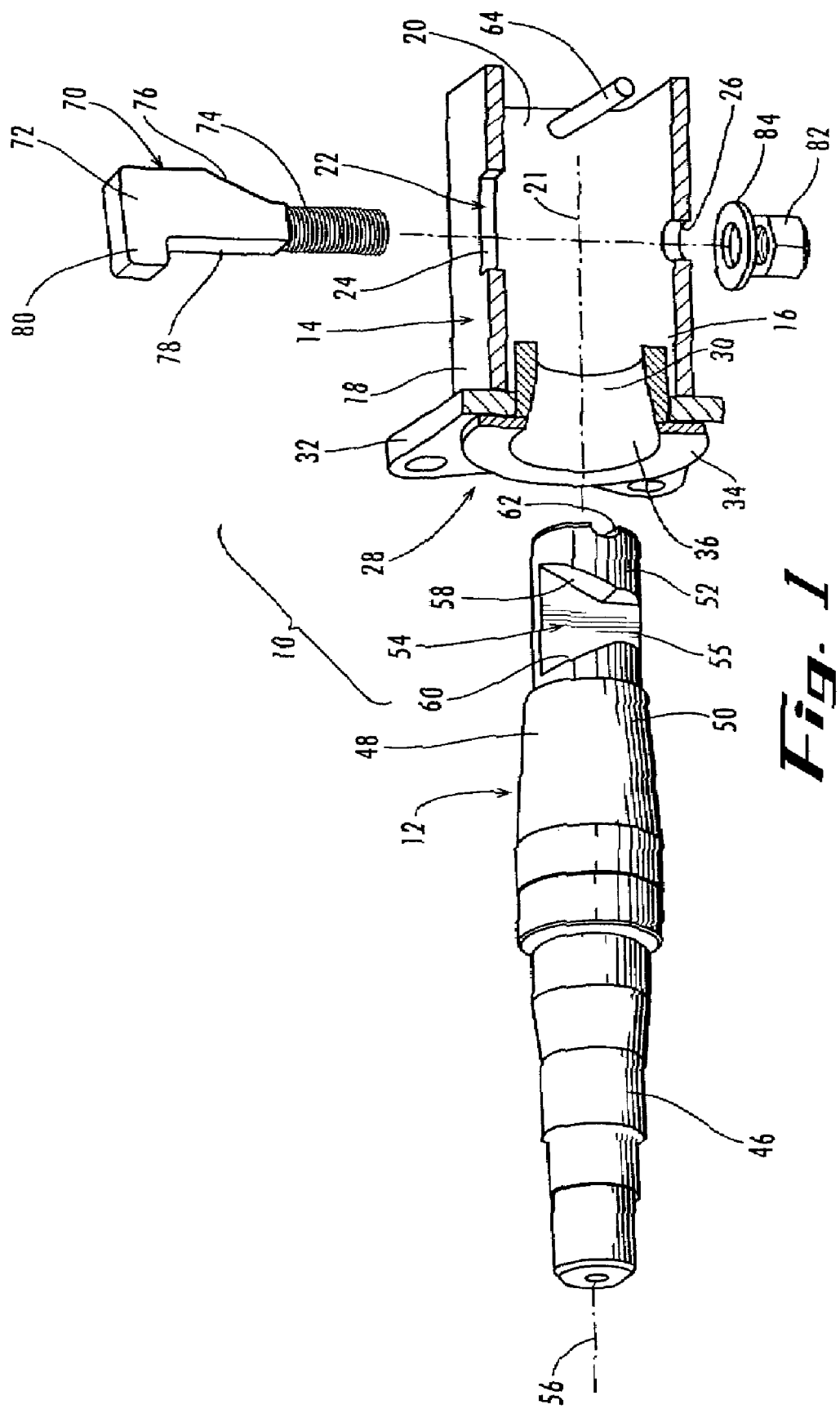
FIG. 1 is an expanded perspective illustration of an end of an axle assembly, showing the spindle extended out from the hollow end of an axle, and the cam key spaced away from the axle. The axle and mounting collar are shown in cross-section.

Referring now in more detail to the drawings, in which like numerals indicate like parts throughout the several views, FIG. 1 shows, in an expanded relationship, an axle assembly 10, showing only one end of axle 14 and the spindle that is received in the axle. A spindle 12 is mounted in the hollow end of an axle 14.

The axle is of tubular configuration, square in cross-section, having hollow ends, usually hollow along its entire length from side to side of a vehicle (the vehicle is not shown). For purposes of description of the invention, only one end of the axle 14 is illustrated.

Axle 14 includes opposed bottom and top walls 16 and 18 and opposed sidewalls 20 (only one shown). A keyhole 22 is formed through the top and bottom walls 16 and 18. The entrance opening 24 of the keyhole is formed in top wall 18, and the entrance opening is rectangular in shape. The guide opening 26 is formed in bottom wall 16 and is in alignment with the entrance opening 24.

Figure 2:
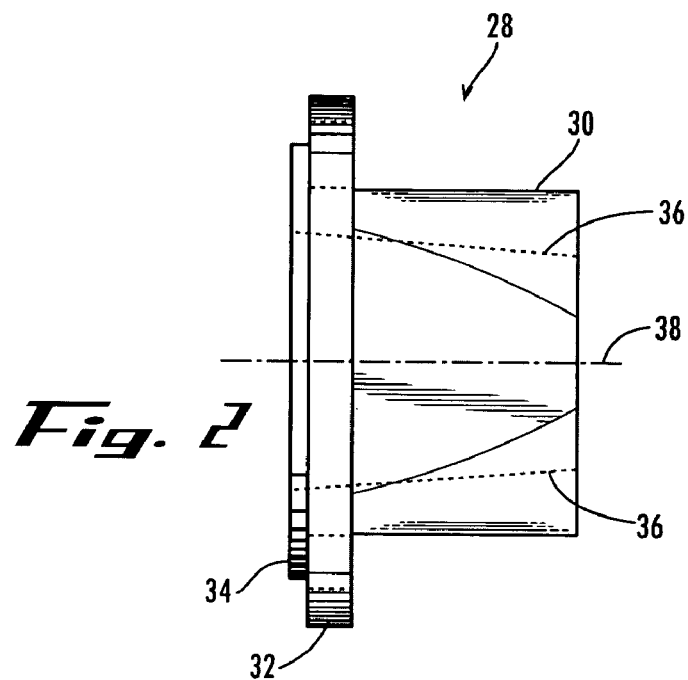
FIG. 2 is a side elevational view of the mounting collar.
Figure 3:
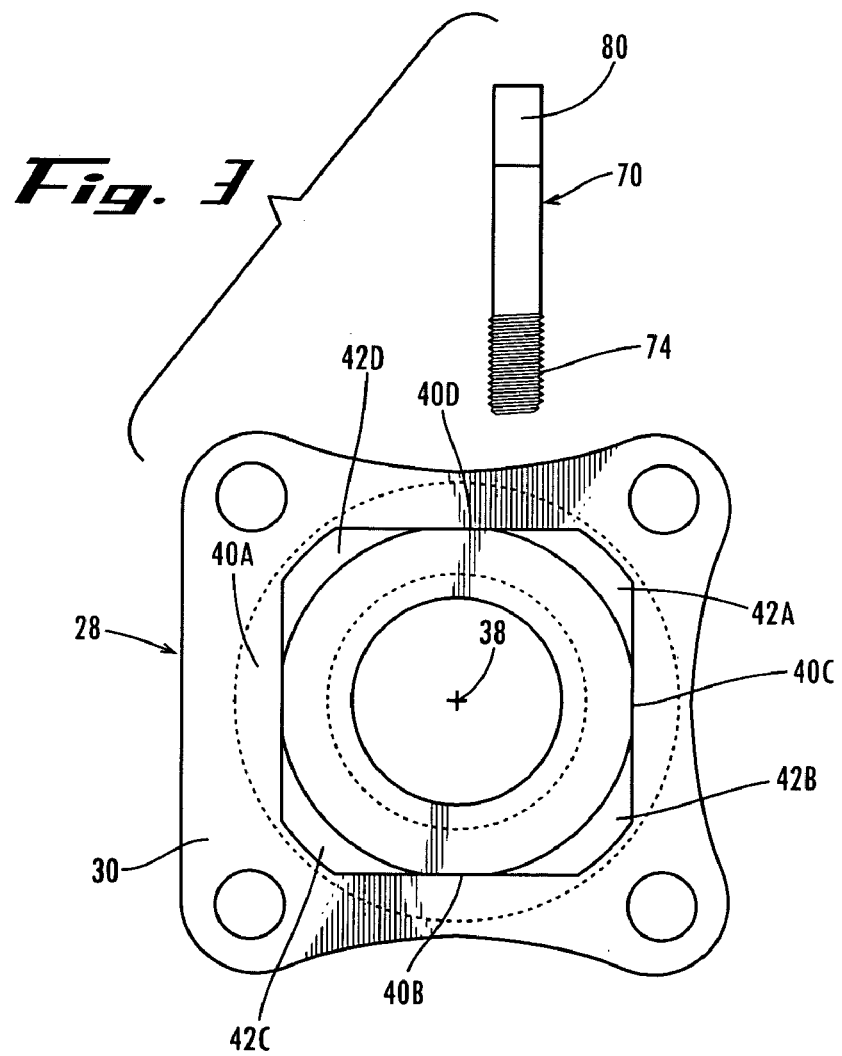
FIG. 3 is a front view of the mounting collar.
Figure 5:
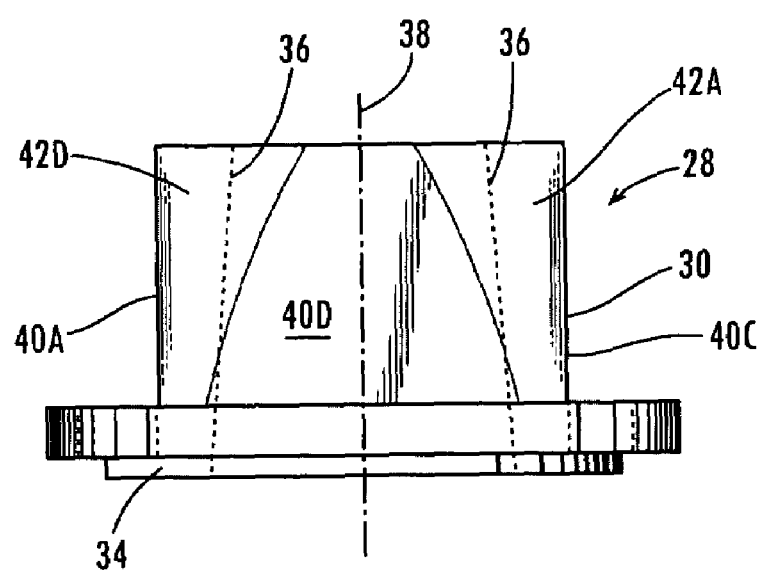
FIG. 5 is a top view of the mounting collar.

Mounting collar 28 is attached to the open end of the axle 14. Mounting collar 28 includes spindle mounting sleeve 30 that fits inside the hollow end of the axle 14, mounting plate 32, and bearing ring 34. These elements form a co-extensive conical converging spindle receiving surface 36 as shown by the dash lines of FIGS. 2 and 5. The spindle receiving surface 36 is coaxial with respect to the longitudinal axis 38 of the mounting collar 28.

The exterior surfaces of the spindle mounting sleeve 30 include flat mounting surfaces 40A, 40B, 40C, and 40D that are sized so as to become snugly received in the hollow end of the axle 14. The corners are beveled at 42A-42D for ease of insertion of the spindle mounting sleeve 30 into the open hollow end of the axle 14.

Figure 4:
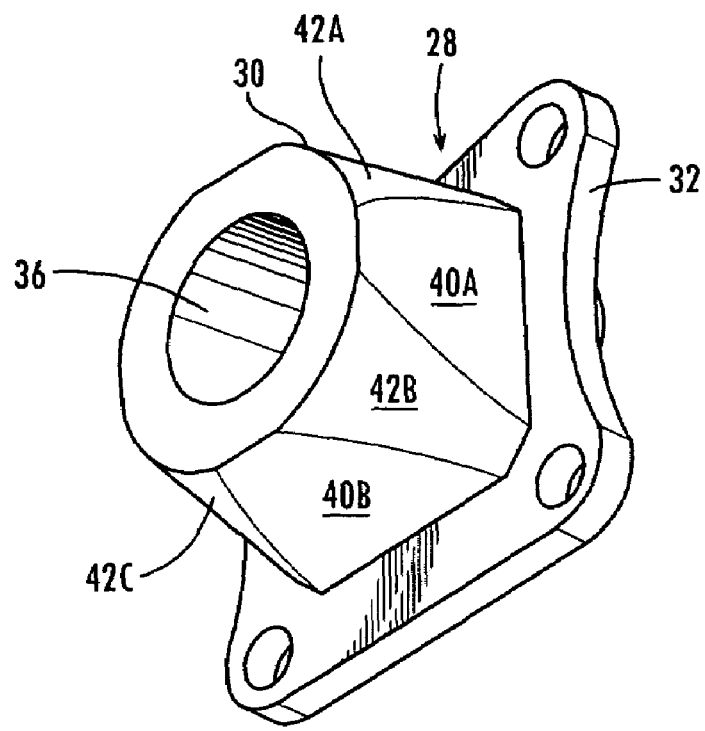
FIG. 4 is a perspective view of the mounting collar.

The spindle mounting sleeve 30, mounting plate 32, and bearing ring 34 are all rigidly connected together, as by welding or machining, to form the mounting collar 28 as illustrated in FIG. 4. The mounting collar 28 is mounted so that its longitudinal axis 38 is coextensive with the longitudinal axis 21 of the hollow end of the axle 14. Typically, the mounting collar will be welded, press fit or otherwise rigidly mounted to the open hollow end of the axle 14.

Spindle 12 includes a wheel support end 46 and an opposed mounting end 48. The wheel support end is shaped for receiving the bearing ring and other elements of a wheel structure, whereas the spindle mounting end 48 includes a tapered section 50 that is movable into and becomes seated in the converging spindle receiving surface 36. The inner or proximal end 52 of the spindle 12 defines a cam slot 54 that has a radial surface 55 that extends radially with respect to the longitudinal axis 56 of the spindle. Cam slot 54 includes opposed, diverging bearing surfaces 58 and 60 that are oriented transverse with respect to the longitudinal axis 56 of the spindle and face the entrance opening 24 of the keyhole 22.

A positioning means is formed on the spindle and in the axle that conform in shape to each other and locate the spindle in precise alignment with the keyhole of the axle. The positioning means includes positioning slot 62 that extends across the innermost surface of the proximal end portion 52 of the spindle, and a positioning bar 64 that is mounted at its ends to opposed walls of the axle 14, in holes 66 in the opposed surfaces of the axle. The positioning bar can be rigidly mounted or removably inserted in the axle at a position displaced from the open end of the axle and displaced from the key hole 22 of the axle. The positioning bar 64 is located at a distance from the end of the axle so that it will receive the positioning slot 62 at the end of the spindle when the spindle is properly seated in the open end of the axle. Typically, the spindle will be inserted so that its positioning slot is not perfectly aligned with the positioning bar, and then will be rotated so as to become aligned with and seat on the positioning bar. The relationship of the positioning slot and positioning bar is such that when the positioning slot is properly seated on the positioning bar, the cam slot 54 and its radially extending surface 55 are aligned with keyhole 22.

Cam key 70 is sized and shaped to be received in keyhole 22 of axle 14 and received in the cam slot 54 of the spindle 12. Cam key 70 includes at one end a body portion 72, at the other end a threaded shank 74, and a cam surface 76 between its ends. The body portion 72 is undercut at 78 on the side opposite the cam surface 76, leaving an overhanging guide block 80. The thickness of the cam key 70 corresponds to the width of the key hole 22, and the length of the upper end, including the guide block 80, corresponds to the length of the entrance opening 24 of the key hole. The depth of the cam key is sufficient for the cam key to be seated as hereinafter described with a portion of its threaded shank protruding from the guide opening 26 of the keyhole.

OPERATION

When the axle 14 is ready to receive a spindle, the mounting collar 28 will have been rigidly mounted to the end of the axle as shown in FIGS. 1 and 6-8. The positioning bar 64 will also have been mounted to or inserted into the axle.

As shown in FIG. 1, the worker aligns the spindle 12 with the mounting collar 28 and moves the spindle mounting end 48 of the spindle through the mounting collar 28 until the tapered section 50 of the spindle engages the converging spindle receiving surface 36 of the spindle mounting sleeve 30 of the collar. In the meantime, the positioning slot 62 at the innermost end of the spindle approaches the positioning bar 64. If the positioning slot is not aligned with the positioning bar, the worker rotates the spindle until the positioning slot becomes parallel to the positioning bar and moves about the positioning bar. This properly orients the cam slot 54 with the keyhole 22.

Figure 6:
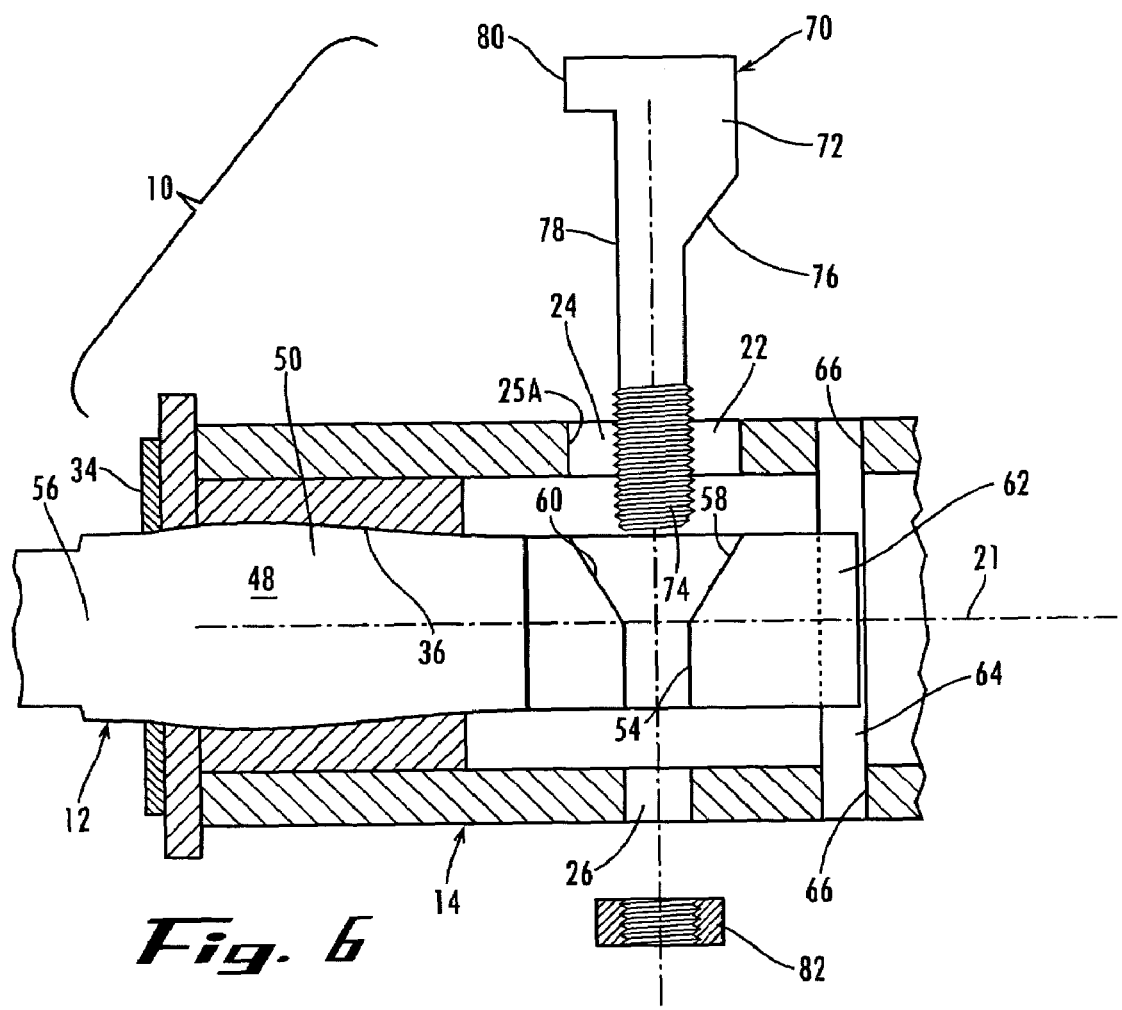
FIG. 6 is a side cross-sectional view of the hollow end of an axle, showing the mounting portion of the spindle inserted through the collar into the hollow end of the axle, and the cam key spaced away from its seated position.

As shown in FIG. 6, the worker then places the cam key 70 in alignment with the key hole 22 of the axle, and moves the cam key, threaded shank 74 first, into the key hole 22, with the cam surface 76 oriented so as to become engaged with the bearing surface 58 of the cam slot 54.

Figure 7:
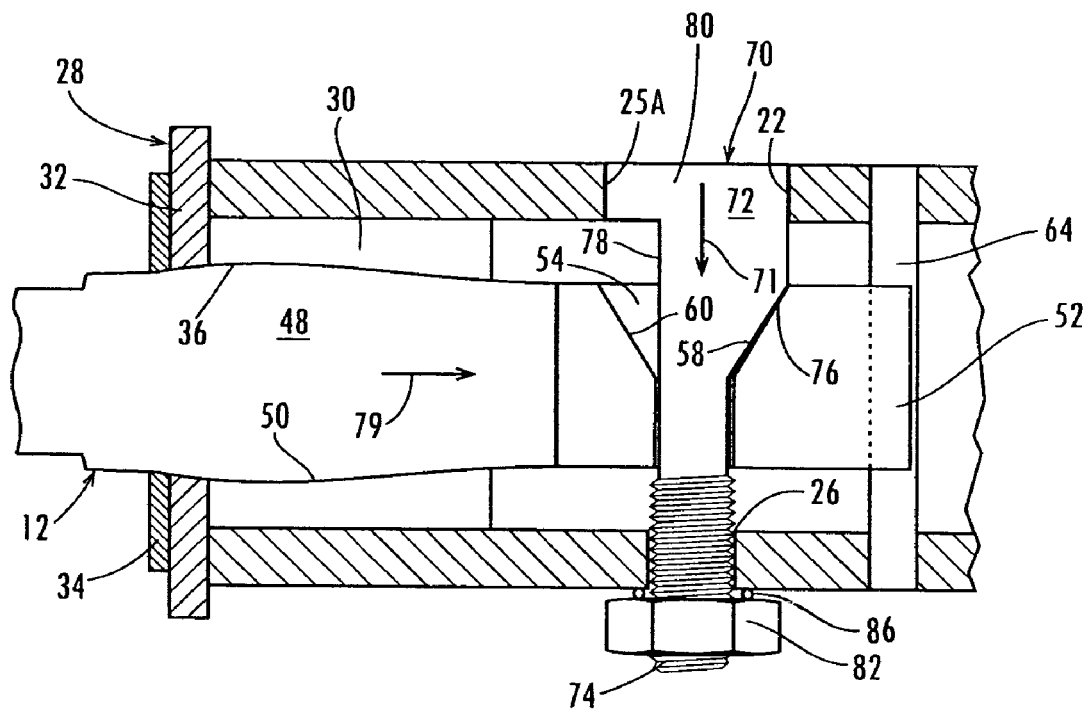
FIG. 7 is a side cross-sectional view of an end of the axle assembly, showing the inward movement of the cam key as the spindle is seated in the axle.

As shown in FIG. 7, the cam key 70 is thrust through the key hole and through the cam slot as indicated by arrow 71, its cam surface 76 engages the bearing surface 58 of the cam slot 54, tending to urge the spindle into the open end of the axle in the direction indicated by arrow 79, so that the spindle makes firm frictional engagement with the converging spindle receiving surface 36.

The length of the cam key 70 is sufficient so that the threaded shank 74 protrudes through the guide opening 26 of key hole 22 and a threaded nut 82 with a lock washer 84 (FIG. 1) or other type washer 86 (FIG. 7) are screwed onto the exposed threads of the threaded shank 74. The threaded nut can be torqued to a tightness that tends to further urge the cam surface 76 into contact with the bearing surface 58 of the cam slot 54.

When the cam key 70 is fully inserted in the key hole 22, extending through the cam slot 54 of the spindle 12, the guide block 80 at the outer end of the cam key becomes engaged with the adjacent edge 25A of the entrance opening 24, and the shank 74 is snugly received in the guide opening 26 of the key hole. The engagement of the cam key at both of its ends in the key hole 22 stabilizes the cam key as its cam surface 76 moves into forced engagement with the bearing surface 58 of the cam slot of the spindle. Thus, the inward movement of the cam key tends to urge the spindle 12 inwardly of the axle 14, with the longitudinal force applied by cam surface 76 to the bearing surface 58 derived from the engagement of the cam key with the engaged surfaces of the keyhole 22.

Moreover, the cam key 70 and the positioning bar 64 function to support the proximal end of the spindle 12, while the mounting collar 28 supports the spindle at the converging spindle receiving surface 36. These three support points, first at the converging spindle receiving surface 36, second at the cam key 70, and third at the positioning bar 64, all function to provide support to the spindle mounting end 48, thereby increasing the strength of the spindle 12 in its connection to the axle 14.

Figure 8:
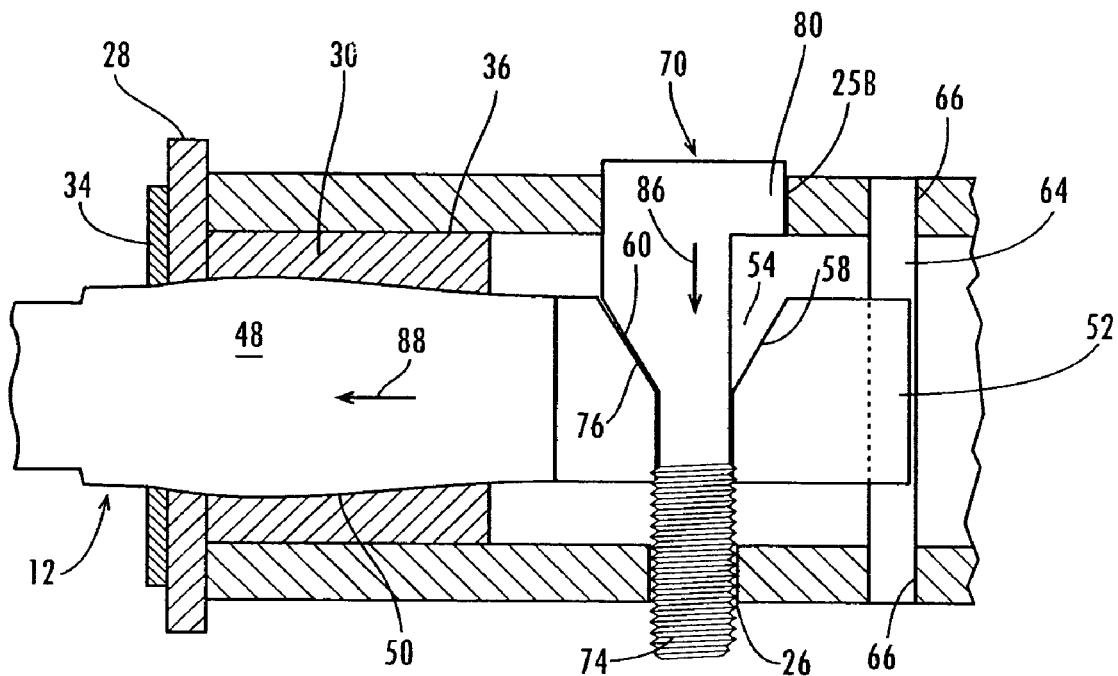
FIG. 8 is a side cross-sectional view, similar to FIGS. 6 and 7, but showing the movement of the cam key into the axle as it urges the spindle out of the axle.

When the worker desires to remove the spindle 12 from the axle 14, the worker removes the nut 82 from the end of the cam key 70, hammers against the exposed end of the threaded shank 74 until the cam key 70 is removed from the key hole 22. The worker then reverses the position of the cam key 70 from the position shown in FIG. 7 to the position shown in FIG. 8. The worker next reinserts the cam key as indicated by the arrow 86 in the key hole 22 and the cam slot 54, and hammers the exposed portion of the body of the cam key cam key 70 so that its now-reversed cam surface 76 engages the bearing surface 60 of the cam slot of the spindle. As shown in FIG. 8, the force applied by the cam surface is transmitted from the guide block 80 and the threaded shank of the cam key. This tends to force the spindle 12 in the direction indicated by arrow 88, loosening the spindle with respect to the axle. The cam key 70 is then withdrawn completely from the keyhole 22 and the spindle is now free for withdrawal from the axle.

The cam key 70 and the cam slot 54 are illustrated as having a specific configuration for mounting and demounting the spindle with respect to the axis. However, other cam surfaces and cam arrangements can be used for similar functions. The cam means 76 and the bearing surfaces 58 and 60 are disclosed as having specific sloped angles; however, other angles and surface configurations can be used, if desired.

The cam slot 54 is formed with an open side, as shown in FIG. 1. However, the cam slot can be formed internally of the spindle, if desired.

From the illustration of FIG. 8, it can be seen that when the cam key is being driven into the keyhole, its guide block 80 will engage the opposite edge 25B of the entrance opening 24 of the keyhole 22. Thus, as the force applied by the cam key 70 is being applied to the bearing surface 60, the counter forces are being applied by the cam key to the adjacent side edge 25B of the entrance opening and by the threaded shank to the guide opening 26.

Although preferred embodiments of the invention has been disclosed in detail herein, it will be obvious to those skilled in the art that variations and modifications of the disclosed embodiments can be made without departing from the spirit and scope of the invention as set forth in the following claims.

What is claimed is:

1. A wheel axle assembly for a vehicle, including:
an axle for extending across the vehicle, said axle having hollow ends, said axle assembly including at each end:
a mounting collar rigidly supported by the hollow end of said axle,
a spindle received in said mounting collar and extending into the hollow end of said axle,
said hollow end of said axle defining a key hole extending across said axle,
said spindle including therein opposed bearing surfaces alignable with said key hole when said spindle is inserted into the hollow end of said axle,
a cam key extendable through said key hole of said axle to a position in alignment with said bearing surfaces of said spindle when said spindle is inserted in the hollow end of the axle,
said cam key including cam means for engaging said bearing surfaces one at a time such that when said cam key is oriented in one direction and inserted into the keyhole its cam means engages one of said bearing surfaces and urges the spindle in one direction along the axle and when said cam key is oriented in another direction and inserted into the keyhole its cam means engages the other bearing surface and urges the spindle in the opposite direction along the axle.

2. The wheel axle assembly of claim 1, wherein
said bearing surfaces of said spindle are oppositely sloped.

3. The wheel axle assembly of claim 2, wherein
said cam means of said cam key comprises a single sloped surface for wedge engagement with both said bearing surfaces.

4. The wheel axle assembly of claim 3, wherein
said keyhole extends entirely through said axle, and said cam key has an end with helical threads that protrude from said keyhole, and
a retainer for engaging said threads outside said axle for holding said cam key in said axle.

5. The wheel axle assembly of claim 1, wherein said axle is of square tubular configuration.

6. The wheel axle assembly of claim 1, and further including:
said axle and said spindle including complementary shapes for aligning said bearing surfaces of said spindle with said keyhole.

7. The wheel assembly of claim 6, wherein said complementary shape of said axle comprises a bar extending across said axle, and wherein said complementary shape of said spindle comprises a recess formed in said spindle that receives said bar.

8. A wheel axle assembly for a vehicle, including:
an axle for extending across the vehicle, said axle having hollow ends, said axle assembly including at each end:
a spindle received in and extending into the hollow end of said axle,
said hollow end of said axle defining a key hole extending across said axle,
said spindle including therein a cam slot alignable with said key hole when said spindle is inserted into the hollow end of said axle,
said cam slot having opposed oppositely sloped bearing surfaces,
a cam key extendable through said key hole of said axle and into said cam slot of said spindle when said spindle is inserted in the hollow end of the axle,
said cam key including cam means for alternately engaging said bearing surfaces of said cam slot for urging the spindle in one direction along the axle when engaging one bearing surface and for urging the spindle in the opposed direction when engaging the other bearing surface.

9. The wheel axle assembly of claim 8, wherein
said cam means of said cam key comprises a single sloped surface for wedge engagement with both said bearing surfaces.

10. The wheel axle assembly of claim 9, wherein
said keyhole extends entirely through said axle, and
said cam key has an end with helical threads that protrude from said keyhole, and
a retainer for engaging said threads outside said axle for holding said cam key in said axle.

11. The wheel axle assembly of claim 8, wherein said axle is of substantially square tubular cross sectional configuration.

12. The wheel axle assembly of claim 8, and further including:
said axle and said spindle including complementary shapes for aligning said bearing surfaces of said spindle with said keyhole.

13. The wheel assembly of claim 12, wherein said complementary shape of said axle comprises a bar extending across said axle, and wherein said complementary shape of said spindle comprises a recess formed in said spindle that receives said bar.

14. In combination, a wheel spindle and a cam key,
said spindle including a rectilinear spindle body having a longitudinal axis, a wheel support end for supporting a wheel and a mounting end for mounting to an axle,
said mounting end defining a cam slot extending radially therethrough and having oppositely sloped opposed bearing surfaces,
said cam key configured to fit in said cam slot and including a sloped cam surface for engagement with one of said bearing surfaces at a time for urging said spindle along its longitudinal axis.

15. The combination of claim 14, and further including a retainer for retaining said cam key in said cam slot.

16. The combination of claim 14, and further including a tubular axle of square cross section,
a mounting collar rigidly mounted on each end of said axle,
said mounting end of one of said spindles received in said mounting collar at each end of said axle and extending into said axle,
said axle defining a keyhole at each of its ends, and
said cam key sized and shaped to extend through said keyhole and said cam slot.

17. An axle assembly for a wheeled vehicle comprising:
a tubular axle,
a spindle inserted into said axle,
a keyhole formed in said axle,
a cam slot formed in said spindle and aligned with said keyhole and including opposed bearing surfaces,
a cam key configured for extending through said keyhole and through said cam slot and including a cam surface for engaging one of said opposed bearing surfaces,
such that when the cam key is in a first position and is moved into the cam slot the cam surface of the cam key engages one of the bearing surfaces of the cam slot and the spindle is urged in a first direction along the axle in response to the cam surface engaging one of the bearing surfaces and when the cam key is in a second position and is moved into the cam slot the cam surface of the cam key engages the other the bearing surface of the cam slot and the spindle is urged in the opposite direction along said axle in response to the cam surface engaging the opposed bearing surface.

18. The axle assembly of claim 17, and further including a bar extending transversely through said axle, and said spindle including a recess that engages said bar for orienting the spindle with respect to the keyhole of said axle.

19. A method of mounting and de-mounting a spindle to an axle, the axle having a hollow end, comprising:
when the spindle is to be attached to the axle:
inserting a spindle longitudinally into a hollow end of the axle,
orienting a cam key in a first position and inserting the cam key transversely through the axle and through a cam slot of the spindle with a cam surface on the cam key engaging a first bearing surface of the cam slot and urging the spindle into the axle, and
when the spindle is to be removed from the axle:
orienting the cam key in a second position and inserting the cam key transversely through the axle and through the cam slot of the spindle with the cam surface on the cam key engaging a second bearing surface on the cam slot and urging the spindle out of the axle.

* * * * *